(12) United States Patent
Wu et al.

(10) Patent No.: US 12,672,129 B2
(45) Date of Patent: Jun. 30, 2026

(54) TRANSMISSION PROCESSING METHOD AND RELATED DEVICE

(71) Applicant: VIVO MOBILE COMMUNICATION CO., LTD., Dongguan (CN)

(72) Inventors: Kai Wu, Dongguan (CN); Na Li, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 325 days.

(21) Appl. No.: 18/221,425

(22) Filed: Jul. 13, 2023

(65) Prior Publication Data

US 2023/0362924 A1 Nov. 9, 2023

Related U.S. Application Data

(63) Continuation of application No. PCT/CN2022/071648, filed on Jan. 12, 2022.

(30) Foreign Application Priority Data

Jan. 13, 2021 (CN) .......................... 202110043140.7

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
CPC .......................... H04W 72/23; H04W 72/1268
(Continued)

(56) References Cited

U.S. PATENT DOCUMENTS 12,095,562 B2 * 9/2024 Bai ........................ H04L 1/1864
12,166,705 B2 * 12/2024 Park ...................... H04W 72/23
(Continued)

FOREIGN PATENT DOCUMENTS

CN 111586850 A 8/2020
CN 111886820 A 11/2020
(Continued)

OTHER PUBLICATIONS

International Search Report issued in corresponding International Application No. PCT/CN2022/071648, mailed Mar. 30, 2022, 4 pages.

(Continued)

*Primary Examiner* — Peter G Solinsky
(74) *Attorney, Agent, or Firm* — IPX PLLC

(57) ABSTRACT

A transmission processing method and a related device are provided. The method includes: receiving, by a terminal, first indication information from a network device; and determining, by the terminal, N time domain resources of a target physical uplink shared channel (PUSCH) based on the first indication information, where N is an integer greater than 1. The first indication information is used to indicate at least one of the following: the first time domain resource of the target PUSCH; a quantity of time domain resources for transmitting the target PUSCH, and a start symbol occupied in one time domain resource and a symbol length; or the N time domain resources.

15 Claims, 6 Drawing Sheets

Send, by a network device, first indication information to a terminal — 601

Determine, by the network device, N time domain resources of a target physical uplink shared channel based on the first indication information — 602

(58) Field of Classification Search
USPC ........................................................ 370/329

See application file for complete search history.

(56) References Cited

U.S. PATENT DOCUMENTS

| | | | | |
|---|---|---|---|---|
| 12,273,913 | B2 * | 4/2025 | Xiong | H04W 74/0866 |
| 2019/0053211 | A1 | 2/2019 | Ying et al. | |
| 2020/0145965 | A1 * | 5/2020 | Luo | H04L 5/0032 |
| 2020/0145997 | A1 * | 5/2020 | Luo | H04W 72/0446 |
| 2020/0170010 | A1 * | 5/2020 | Luo | H04L 5/26 |
| 2021/0235476 | A1 * | 7/2021 | Luo | H04W 40/22 |
| 2021/0360701 | A1 * | 11/2021 | Xu | H04L 5/0048 |
| 2023/0035862 | A1 * | 2/2023 | Yuan | H04W 72/21 |
| 2023/0254795 | A1 * | 8/2023 | Ryu | H04W 72/21 |
| | | | | 370/350 |
| 2024/0049234 | A1 * | 2/2024 | Yoshimura | H04L 5/0053 |
| 2024/0064736 | A1 * | 2/2024 | Lin | H04W 72/1268 |
| 2025/0062866 | A1 * | 2/2025 | Moon | H04W 76/27 |

FOREIGN PATENT DOCUMENTS

| | | | | |
|---|---|---|---|---|
| CN | 111436136 | A | 7/2022 | |
| EP | 4401334 | A2 * | 7/2024 | ......... H04B 7/06964 |
| WO | 2018000929 | A1 | 1/2018 | |
| WO | 2020/226391 | A | 11/2020 | |
| WO | WO-2021159057 | A1 * | 8/2021 | ........... H04W 72/23 |
| WO | WO-2024235056 | A1 * | 11/2024 | ........... H04L 5/1469 |

OTHER PUBLICATIONS

Ericsson, "Summary of views on CSI reporting v3", 3GPP TSG-RAN WG1 Meeting #94 R1-1809796, Aug. 2018, 43 pages.

Extended European Search Report issued in related European Application No. 22739054.9, mailed Jun. 17, 2024, 10 pages.

Notice of Reason of Refusal in related Japanese Application No. 2023-542013, mailed May 14, 2024, 7 pages.

* cited by examiner

12

Network
device

11

Terminal

Receive, by a terminal, first indication information
from a network device

201

Determine, by the terminal, N time domain resources
of a target physical uplink shared channel based on the
first indication information

202

Uplink scheduling DCI

Multi-slot PUSCH

Uplink scheduling
DCI

Multi-slot PUSCH

1

TRANSMISSION PROCESSING METHOD AND RELATED DEVICE

CROSS-REFERENCE TO RELATED APPLICATIONS

This application is a continuation of International Application No. PCT/CN2022/071648, filed Jan. 12, 2022, which claims priority to Chinese Patent Application No. 202110043140.7, filed Jan. 13, 2021. The entire contents of each of the above-referenced applications are expressly incorporated herein by reference.

TECHNICAL FIELD

This application relates to the field of communications technologies, and in particular, to a transmission processing method and a related device.

BACKGROUND

In a communications system, uplink and downlink transmission can usually be implemented by scheduling a time-frequency resource. For example, transmission of a Physical Uplink Shared Channel (PUSCH) can be scheduled through dynamic scheduling or semi-static scheduling. Currently, time domain scheduling is based on a slot, which means that a PUSCH is usually scheduled for transmission in one slot. When a channel condition remains unchanged and a size of a Transport Block (TB) transmitted in one slot increases, because a number of scheduled Orthogonal frequency division multiplex (OFDM) symbols of the slot is limited, coverage capability may be limited.

SUMMARY

Embodiments of this application provide a transmission processing method and a related device.

According to a first aspect, a transmission processing method is provided, including:

receiving, by a terminal, first indication information from a network device; and determining, by the terminal, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

According to a second aspect, a transmission processing method is provided, including:

sending, by a network device, first indication information to a terminal; and determining, by the network device, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

According to a third aspect, a transmission processing apparatus is provided, including:

a receiving module, configured for receiving, by a terminal, first indication information from a network device; and a first determining module, configured for determining, by the terminal, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

According to a fourth aspect, a transmission processing apparatus is provided, including:

a sending module, configured for sending, by a network device, first indication information to a terminal; and a second determining module, configured for determining, by the network device, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

According to a fifth aspect, a terminal is provided. The terminal includes a processor, a memory, and a program or an instruction stored in the memory and capable of running on the processor, and when the program or the instruction is executed by the processor, the steps of the method according to the first aspect are implemented.

According to a sixth aspect, a network device is provided. The network device includes a processor, a memory, and a program or an instruction stored in the memory and capable of running on the processor, and when the program or the instruction is executed by the processor, the steps of the method according to the second aspect are implemented.

According to a seventh aspect, a readable storage medium is provided. The readable storage medium stores a program or an instruction, and when the program or the instruction is executed by a processor, the steps of the method according to the first aspect or the steps of the method according to the third aspect are implemented.

According to an eighth aspect, an embodiment of this application provides a chip. The chip includes a processor and a communications interface, the communications interface is coupled to the processor, and the processor is configured to run a program or an instruction of a network device, to implement the method according to the second aspect.

According to a ninth aspect, a computer program product is provided. The computer program product is stored in a non-volatile storage medium, and the computer program product is executed by at least one processor, to implement the method according to the first aspect or the method according to the second aspect.

In the embodiments of this application, a terminal receives first indication information from a network device, and the terminal determines N time domain resources of a target physical uplink shared channel PUSCH based on the first indication information, where N is an integer greater than 1. The first indication information is used to indicate at least one of the following: the first time domain resource of the target PUSCH; a quantity of time domain resources for transmitting the target PUSCH, and a start symbol occupied in one time domain resource and a symbol length; or the N time domain resources. In this way, multiple time domain resources can be used to transmit a PUSCH, so that in a case that sizes of transport blocks are the same, compared to transmission of a single time domain resource, a bit rate of transmission can be reduced to improve reliability of the transmission, so that coverage capability of the transmission can be improved. In addition, in a case that the same bit rates are used, a throughput rate of the transmission can be improved. Therefore, the embodiments of this application can improve transmission performance.

DETAILED DESCRIPTION

The following describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that the technology described in the embodiments of this application is not limited to a Long Term Evolution (LTE)/LTE-Advanced (LTE-A) system, and may also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, the following descriptions describe a New Radio (NR) system for example purposes, and NR terms are used in most of the following descriptions, although these technologies can also be applied to an application other than an NR system application, for example, a 6th generation (6G) communications system.

Figures 1, 2:
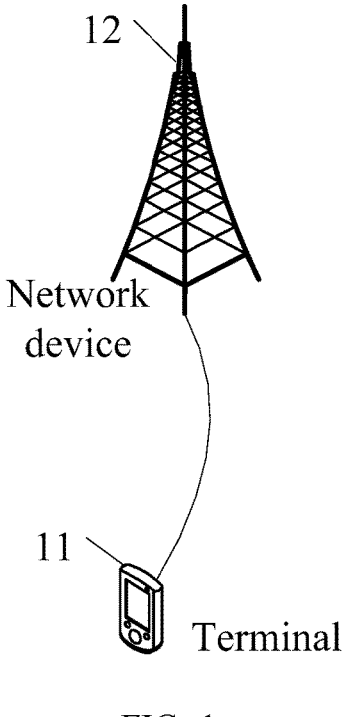
FIG. 1 is a structural diagram of a network system to which the embodiments of this application can be applied.
FIG. 2 is a flowchart of a transmission processing method according to an embodiment of this application.

FIG. 1 is a block diagram of a wireless communications system to which an embodiment of this application can be applied. The wireless communication system includes a terminal 11 and a network device 12. The terminal 11 may be referred to as a terminal device or User Equipment (UE). The terminal 11 may be a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), and pedestrian user equipment (PUE). The wearable device includes a bracelet, a headset, and glasses. It should be noted that a specific type of the terminal 11 is not limited in this embodiment of this application. The network device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmitting receiving point (TRP), or some other appropriate term in the art. As long as the same technical effect is achieved, the base station is not limited to a specific technical term. It should be noted that the base station in the NR system is taken only as an example in the embodiments of this application, but a specific type of the base station is not limited.

For ease of understanding, the following describes some content in the embodiments of this application.

1. A start position and a length of a symbol allocated by a time domain resource.

For transmission of a repetition type A, a corresponding mapping type may be a mapping type A and a mapping type B.

If the mapping type of the transmission of the repetition type A is the mapping type A, $S=0$, $L=4$ to 14, $S+L=4$ to 14, where S is an index of a start symbol allocated by a time domain resource and L is a length of the symbol allocated by the time domain resource.

If the mapping type of the transmission of the repetition type A is the mapping type B, $S=0$ to 13, $L=1$ to 14, $S+L=1$ to 14.

For transmission of a repetition type B, a corresponding mapping type can only be the mapping type B, and S=0 to 13, L=1 to 14, and S+L=1 to 27.

2. Time domain resource configuration.

In time domain resource configuration, the following are included:

a slot offset value K2;

a start and length indicator value (SLIV), or S and L; and a mapping type.

In some embodiments, in a case that repetition transmission is configured, the time domain resource configuration further includes a quantity of repetitions.

For the transmission of the repetition type A, the SLIV determines S and L by using the following methods:

If $(L-1) \leq 7$, SLIV=14*$(L-1)$+$S$; and

If $(L-1) > 7$, SLIV=14*$(L-1)$+$S$.

$0 < L \leq 14-S$.

The following describes in detail the transmission processing method provided in the embodiments of this application through specific embodiments and application scenarios thereof with reference to the accompanying drawings.

Referring to FIG. 2, FIG. 2 is a flowchart of a transmission processing method according to an embodiment of this application. The method is performed by a terminal. As shown in FIG. 2, the method includes the following steps.

Step 201: Receive, by a terminal, first indication information from a network device.

Step 202: Determine, by the terminal, N time domain resources of a target Physical Uplink Shared Channel (PUSCH) based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

In some embodiments, that the first indication information is used to indicate the first time domain resource of the target PUSCH can be understood as that the first indication information indicates resource information of the first time domain resource. For example, the first indication information may include time domain resource offset of the first time domain resource or a time domain slot index of the first time domain resource. The terminal determines other N−1 time domain resources based on a position of the first time domain resource. The N−1 time domain resources are other time domain resources that are located after the first time domain resource. It should be understood that in this embodiment, the network device may indicate a quantity of time domain resources occupied by a scheduled PUSCH, that is, a value of N.

In some embodiments, the first indication information is used to indicate a quantity of time domain resources for transmitting the target PUSCH, and a start symbol occupied in one time domain resource and a symbol length. It can be understood that the first indication information indicates a condition in which the time domain resource of the target PUSCH is determined. In this case, the terminal can determine that the N time domain resources that satisfy the condition are the time domain resources of the target PUSCH. It should be noted that in this embodiment, the N time domain resources that satisfy the condition can be searched for since the first indication information is received, or the network device can indicate a start moment since which the N time domain resources that satisfy the condition can be searched for. For example, a time offset value can be configured, and an end moment of a scheduled time domain resource corresponding to Downlink Control Information (DCI) of the scheduled PSUCH plus the time offset value serves as the start moment.

In some embodiments, the first indication information is used to indicate the N time domain resources. It can be understood that the network device displays resource information that indicates the N time domain resources.

It should be noted that the foregoing time domain resource may be understood as a slot or all symbols corresponding to the slot.

It should be understood that the foregoing N time domain resources may be either a continuous or discontinuous time domain resource. This is not further limited herein.

In some embodiments, a transmission type of the target PUSCH is transmission of a single PUSCH on multiple time domain resources. In some embodiments, the foregoing transmission of a single PUSCH transmission on multiple time domain resources may mean a single PUSCH over multi-slot, or may be referred to as multi-slot PUSCH scheduling. In other words, the target PUSCH is a PUSCH that is transmitted on the N time domain resources after one transport block is encoded, that is, after a transport block of the target PUSCH is encoded, the target PUSCH is transmitted on a plurality of transmission resources in N slots.

In the embodiments of this application, a terminal receives first indication information from a network device, and the terminal determines N time domain resources of a target physical uplink shared channel PUSCH based on the first indication information, where N is an integer greater than 1. The first indication information is used to indicate at least one of the following: the first time domain resource of the target PUSCH; a quantity of time domain resources for transmitting the target PUSCH, and a start symbol occupied in one time domain resource and a symbol length; or the N time domain resources. In this way, multiple time domain resources can be used to transmit a PUSCH, so that in a case that sizes of transport blocks are the same, compared to transmission of a single time domain resource, a bit rate of transmission can be reduced to improve reliability of the transmission, so that coverage capability of the transmission can be improved. In addition, in a case that the same bit rates are used, a throughput rate of the transmission can be improved. Therefore, the embodiments of this application can improve transmission performance.

In some embodiments, in a case that the first indication information is used to indicate the first time domain resource of the target PUSCH, the determining, by the terminal, N time domain resources of a target physical uplink shared channel PUSCH based on the first indication information includes:

determining, by the terminal, N−1 time domain resources located after the first time domain resource based on a target parameter; and determining, by the terminal, the N−1 time domain resources and the first time domain resource as time domain resources of the target PUSCH.

The target parameter includes at least one of the following: a frame structure, a slot structure, or a sending resource of a signal and a receiving resource of a signal.

In the embodiment of this application, the foregoing first indication information can be carried in higher layer signaling or DCI, that is, the terminal can configure the first transmission resource based on the higher layer signaling or determine the first transmission resource based on the DCI, and then determine remaining N−1 time domain resources based on a frame structure, a slot structure, and a sending resource of a signal and a receiving resource of a signal that are configured by the network device. It should be understood that the determining a time domain resource based on a frame structure can be understood as determining a valid time domain resource of the target PUSCH based on a slot used for uplink transmission and downlink transmission. For example, a slot used for uplink transmission can be determined as the valid time domain resource of the target PUSCH. The determining a time domain resource based on a slot structure can be understood as determining a valid time domain resource of the target PUSCH based on a symbol type in a slot. For example, a downlink symbol in a slot can be determined as a valid time domain resource of the target PUSCH. Further, a downlink symbol indicated by the network devices semi-statically or dynamically, and a flexible symbol indicated by the network device semi-statically or dynamically can be determined as an invalid time domain resource of the target PUSCH. The determining a time domain resource based on a sending resource of a signal and a receiving resource of a signal can be understood as determining a valid time domain resource of the target PUSCH based on a type of a sending resource and a receiving resource. For example, a time domain resource for transmitting a Synchronization Signal and PBCH block (SSB) or a Channel State Information Reference Signal (CSI-RS) can be determined as an invalid time domain resource of the target PUSCH.

In some embodiments, the N time domain resources exclude at least one of the following resources:

a downlink symbol indicated by the network device semi-statically or dynamically;

a flexible symbol indicated by the network device semi-statically or dynamically;

a time domain resource for transmitting a synchronizing signal block SSB or a channel state information-reference signal CSI-RS;

a PUSCH resource, where the network device indicates that transmission of the PUSCH resource is canceled by using a first physical downlink control channel (PDCCH), and the first PDCCH is a PDCCH scrambled by a Cancellation Indication Radio Network Temporary Identifier (CI-RNTI);

another uplink transmission resource that is used for other than the target PUSCH and that is indicated by the network device;

an invalid first time domain resource indicated by the network device; or a second time domain resource, where a number of valid symbols of the second time domain resource is smaller than a number of symbols indicated by the network device.

For the downlink symbol indicated by the network device semi-statically or dynamically, for example, in some embodiments, when a certain time domain resource is a downlink symbol indicated by the network device semi-statically or dynamically, the terminal can determine that the time domain resource is not a valid resource of the target PUSCH.

For the flexible symbol indicated by the network device semi-statically or dynamically, for example, in some embodiments, when a certain time domain resource is a flexible symbol indicated by the network device semi-statically or dynamically, the terminal can determine that the time domain resource is not a valid resource of the target PUSCH.

For a time domain resource for transmitting a synchronizing signal block SSB or a channel state information-reference signal CSI-RS, for example, in some embodiments, the terminal determines that the time domain resource used for transmitting an SSB or a CSI-RS is not a valid resource of the target PUSCH.

For the PUSCH resource, where the network device indicates that transmission of the PUSCH resource is canceled by using a first PDCCH, for example, in some embodiments, the network device can indicate that the PUSCH resource that is canceled for transmission is not a valid resource by using the PDCCH scrambled by the CI-RNTI.

For the another uplink transmission resource that is used for other than the target PUSCH and that is indicated by the network device, for example, in some embodiments, if the network device indicates that another PUSCH is transmitted on a certain time domain resource, the terminal can determine that the time domain resource is not a valid resource of the target PUSCH.

For the invalid first time domain resource indicated by the network device, for example, in some embodiments, in a case that the terminal receives an invalid resource (for example, invalidSymbol) indicated by the network device, the terminal can determine that the time domain resource is not a valid resource of the target PUSCH.

For the second time domain resource, for example, in some embodiments, it is assumed that a number of valid symbols of a certain time domain resource is A, and the network device indicates that a length of a start symbol occupied by the target PUSCH in one time domain resource is B. In a case that A is smaller than B, the terminal may consider that the time domain resource is a valid time domain resource of the target PUSCH. It should be understood that A may be a continuous number of valid symbols, and B may be understood as a number of symbols occupied in one time domain resource, or a minimum quantity of symbols occupied in one time domain resource. This is not further limited herein.

It should be noted that based on a scheduling type of transmission of a PUSCH, the conditions that the N time domain resources satisfy may not be exactly the same. For example, for dynamic scheduling (dynamic grant, DG), that is, scheduling indicated by the DCI, the foregoing N time domain resources do not satisfy at least one of the following:

a downlink symbol indicated by the network device semi-statically;

a time domain resource for transmitting a synchronizing signal block SSB or a channel state information-reference signal CSI-RS;

a PUSCH resource, where the network device indicates that transmission of the PUSCH resource is canceled by using a first physical downlink control channel PDCCH, and the first PDCCH is a PDCCH scrambled by a cancellation indication radio network temporary identifier CI-RNTI;

another uplink transmission resource that is used for other than the target PUSCH and that is indicated by the network device; or an invalid first time domain resource indicated by the network device.

For configured grant (CG), the foregoing N time domain resources do not satisfy at least one of the following:

a downlink symbol indicated by the network device semi-statically or dynamically; or a flexible symbol indicated by the network device semi-statically or dynamically.

In some embodiments, the first indication information includes a time domain resource allocation table, and the time domain resource allocation table (TDRA table) carries an indicator of the quantity of time domain resources for transmitting the target PUSCH.

In the embodiments of this application, a quantity of the foregoing time domain resources can be understood as a quantity of slots.

In some embodiments, in a case that the first indication information is used to indicate the N time domain resources, the first indication information includes at least one of the following:

at least one first time offset value, where each of the first time offset values corresponds to one of the time domain resources, the first time offset value is used to represent time offset of a corresponding time domain resource relative to a third time domain resource, and the third time domain resource is a time domain resource in which a receiving moment of signaling scheduling transmission of the target PUSCH is located;

at least one second time offset value, where each of the second time offset values corresponds to one of the time domain resources, the second time offset value is used to represent time offset of a corresponding time domain resource relative to a fourth time domain resource, and the fourth time domain resource is the first time domain resource of the target PUSCH or a previous time domain resource used to transmit the target PUSCH; or M groups of time domain resource information, where M is a positive integer and the time domain resource information includes a start symbol and a number of symbols.

It should be understood that in the embodiments of the application, signaling that schedules transmission of the target PUSCH can be carried in the PDCCH. One first time offset value is used to determine a location of one time domain resource. A time unit of the first time offset value may be a slot, that is, one first time offset value is used to determine that a corresponding time domain resource that offsets one or more slots relative to the third time domain resource is the time domain resource of the target PUSCH.

In some embodiments, one first time offset value and at least one second time offset value can be indicated, thereby determining the N time domain resources.

It should be understood that the M groups of time domain information correspond to the N time domain resources, and are used to determine symbol information of each time domain resource in the N time domain resources for transmitting the target PUSCH. For example, in some embodiments, M is equal to 1 or N.

When M is equal to 1, the time domain resource information corresponding to the N time domain resources is the same.

When M is equal to N, the M groups of time domain resource information are in one-to-one correspondence to the N time domain resources. In this case, a start symbol and a number of symbols corresponding to each first time offset value or each second time offset value may be the same or different. This is not further limited herein.

In some embodiments, the first indication information is carried in target downlink control information DCI, and the target DCI is further used to indicate that a transmission type of a scheduled PUSCH includes any one of the following:

transmission of a single PUSCH on multiple time domain resources;

repetition transmission of a PUSCH; or transmission of a plurality of PUSCHs.

In the embodiments of this application, the transmission of a single PUSCH on multiple time domain resources can be understood as transmission of a cross-slot PUSCH, that is, one PUSCH can be transmitted on a plurality of slots. One implementation is to determine a size of a transport block of a PUSCH based on a total quantity of symbols/resource elements (RE) in a plurality of slots. The transmission of a PUSCH in a plurality of slots may be continuous or discontinuous. In some embodiments, the foregoing repetition transmission of a PUSCH can be represented as a PUSCH with multi-slot repetition.

It should be noted that the method in which the DCI indicates a transmission type of a scheduled PUSCH can be set according to an actual need. For example, in some embodiments, the transmission type of a scheduled PUSCH can be implicitly indicated by using a DCI format. For example, a DCI format dedicated to scheduling transmission of a single PUSCH on multiple time domain resources can be set. A specific DCI format is introduced for a single PUSCH over multi-slot, such as a DCI format 0_3. In other words, in the embodiments of this application, after the receiving, by a terminal, first indication information from a network device, the method further includes:

when a format of the target DCI is a DCI format dedicated to scheduling the transmission of a single PUSCH on multiple time domain resources, determining, by the terminal, that the transmission type of the PUSCH scheduled by the target DCI is the transmission of a single PUSCH on multiple time domain resources.

In some embodiments, when the DCI format is a DCI format that schedules transmission of a plurality of PUSCHs, and indication information can also be added to the DCI to indicate a transmission type of the currently scheduled PUSCH. For example, when the target DCI is a DCI format dedicated to scheduling the transmission of a plurality of PUSCHs, the target DCI carries second indication information, and the second indication information is used to indicate that the transmission type of the PUSCH scheduled by the target DCI is the transmission of a single PUSCH on multiple time domain resources or the transmission of the plurality of PUSCHs.

It should be understood that in the embodiments of this application, the foregoing second indication information may be a 1-bit indication information. The second indication information may be sub indication information in the foregoing first indication information, or may be independent indication information. This is not further limited herein. If the foregoing target DCI is a DCI format for scheduling transmission of a plurality of PUSCHs, and this 1 bit indicates transmission of a multi-slot PUSCH, UE considers that the target DCI indicates multi-slot PUSCH scheduling. Otherwise, it is understood as scheduling of a plurality of different PUSCHs.

In some embodiments, the target DCI satisfies at least one of the following:

that the target DCI carries third indication information, and the third indication information indicates that the transmission type of the PUSCH scheduled by the target DCI is the transmission of a single PUSCH on multiple time domain resources; or that in a case that the network device does not configure that the terminal performs repetition transmission and configures that the terminal performs the transmission of a single PUSCH on multiple time domain resources, the target DCI is used to indicate that the transmission type of the PUSCH scheduled by the target DCI is the transmission of a single PUSCH on multiple time domain resources.

It should be understood that in the embodiments of this application, a quantity of repetition transmission carried by the target DCI is used to indicate a value of N.

In some embodiments, the foregoing second indication information may be a 1-bit indication information. The second indication information may be sub indication information in the foregoing first indication information, or may be independent indication information. This is not further limited herein. If the target DCI contains an indicator of the quantity of repetitions, and the 1 bit indicates transmission of a multi-slot PUSCH, UE interprets the quantity of repetitions as a quantity of resources (a quantity of slots) required by the UE. Alternatively, if the 1 bit does not indicate as transmission of a multi-slot PUSCH, repetition transmission of the PUSCH is performed in a plurality of slots.

In some embodiments, the target DCI indicates a transmission type corresponding to the scheduled PUSCH by using a carried PDCCH, and when the PDCCH is a PDCCH scrambled by a preset RNTI, the transmission type corresponding to the PUSCH scheduled by the target DCI is the transmission of a single PUSCH on multiple time domain resources.

In the embodiments of this application, the foregoing preset RNTI may be a multi-slot Cell Radio Network Temporary Identifier (MSLOT-C-RNTI). When a PUSCH scheduled by a PDCCH that scrambled by a target RNTI is used in a Common search space (CSS), a method of a single PUSCH over multi-slot is not used to transmit the PUSCH. If the higher layer is configured with a slot aggregation factor, the scheduled PUSCH is transmitted by using a method of a PUSCH with multi-slot repetition. Otherwise, the PUSCH is transmitted once.

In some embodiments, the foregoing target RNTI is one of the following RNTIs: a Temporary Cell Radio Network Temporary Identifier (TC-RNTI), C-RNTI, a Configured Scheduling Radio Network Temporary Identifier (CS-RNTI), or Modulation and Coding Scheme Radio Network Temporary Identifier (MCS-C-RNTI).

In some embodiments, before the receiving, by a terminal, first indication information from a network device, the method further includes:

receiving, by the terminal, configuration information from the network device, where the configuration information is used to configure a transmission type of a PUSCH of the terminal, the transmission type includes the transmission of a single PUSCH on multiple time domain resources and the transmission of a plurality of PUSCHs, and the configuration information is Radio Resource Control (RRC) semi-static configuration information or RRC static configuration information.

In the embodiments of this application, when configuration is performed by using RRC semi-static configuration information, the transmission type is only configured to be the transmission of a single PUSCH on multiple time domain resources and the transmission of a plurality of PUSCHs. When the RRC static configuration information is used to configure a transmission type, the transmission type can be configured to be at least one of the transmission of a single PUSCH on multiple time domain resources and transmission of a plurality of PUSCHs. If the two transmission types are configured, the DCI needs to further indicate whether transmission of a currently scheduled or active PUSCH is based on the transmission of a single PUSCH on multiple time domain resources or the transmission of a plurality of PUSCHs. For an indication method of the DCI, refer to the description of the foregoing embodiments. This is not further limited herein.

It should be noted that for a grant scheduling PUSCH of type 1, transmission of the PUSCH can only be semi-statically configured by the RRC.

To better understand this application, implementation of this application is described below by using some examples.

Embodiment 1: Based on FIG. 3 and FIG. 4, a method of determining transmission resources of a plurality of PUSCHs for transmission of the target PUSCH is described. The transmission resources of the plurality of PUSCHs may be continuous or discontinuous, and the transmission resources may be understood as time domain resources, that is, resources in a slot.

Figure 3:
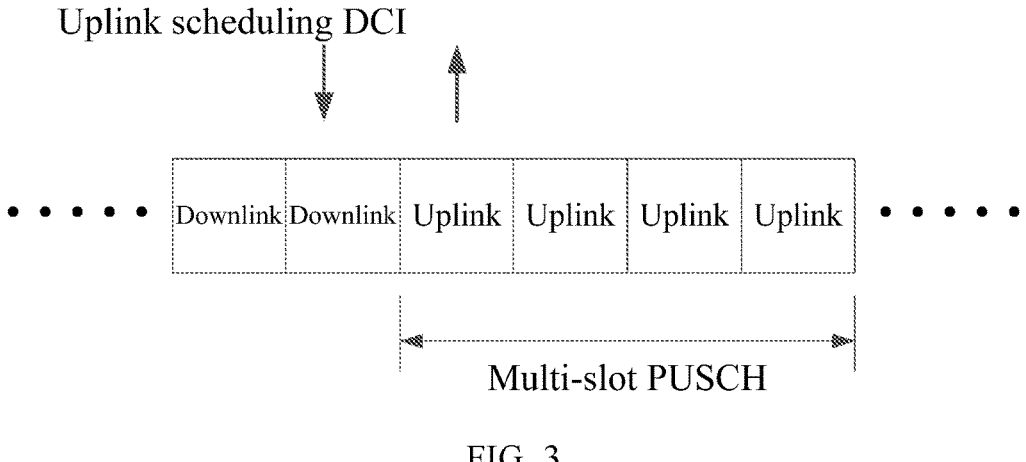
FIG. 3 is a first exemplary diagram of distribution of a time domain resource in a transmission processing method according to an embodiment of this application.

As shown in FIG. 3, resources in a plurality of continuous uplink slots are the same, and the network device indicates that the PUSCH is transmitted in N=4 slots, and L=14 symbols are occupied in each slot. Because the resources in the four continuous slots are all uplink slots, UE performs continuous uplink transmission in the N=4 continuous uplink slots.

Figure 4:
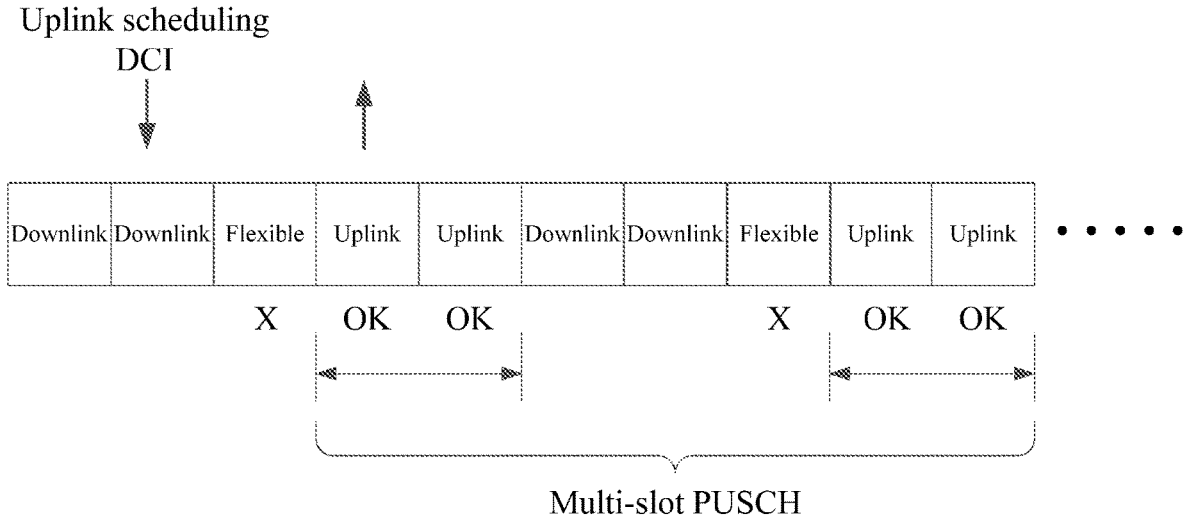
FIG. 4 is a second exemplary diagram of distribution of a time domain resource in a transmission processing method according to an embodiment of this application.

As shown in FIG. 4, a network device terminal performs transmission in N=4 slots, and L=14. Some of the slots are special slots (S slots), that is, the slot may contain at least two of a downlink symbol, an uplink symbol, and a flexible symbol. In other words, not all symbols can be used for uplink transmission. If some symbols are invalid, a PUSCH with L=14 symbols cannot be transmitted, and the UE needs to determine whether each symbol satisfies a condition. If the condition is satisfied, the symbol can be used as a transmission resource for the target PUSCH.

For example, in an S slot, because a number of transmitted uplink symbols is limited, a requirement for a length of a PUSCH cannot be satisfied, the S slot is skipped and a next uplink slot that satisfies the condition continues to be searched until N valid slots are determined. In addition, whether a resource is valid for transmission of the target PUSCH can be determined by using at least one of the following conditions:

being not a downlink symbol indicated by the network device semi-statically or dynamically;

being not a flexible symbol indicated by the network device semi-statically or dynamically;

being not a time domain resource for transmitting a synchronizing signal block SSB or a channel state information-reference signal CSI-RS;

being not a PUSCH resource, where the network device indicates that transmission of the PUSCH resource is canceled by using a first physical downlink control channel PDCCH, and the first PDCCH is a PDCCH scrambled by a cancellation indication radio network temporary identifier CI-RNTI;

being not another uplink transmission resource that is used for other than the target PUSCH and that is indicated by the network device;

being not an invalid first time domain resource indicated by the network device; or being not a second time domain resource, where a number of valid symbols of the second time domain resource is smaller than a number of symbols indicated by the network device.

In some embodiments, the network device can configure a TDRA table, and the TDRA table contains information of a plurality of first time offset values K2, S, and L.

If transmission of the target PUSCH needs to be performed in a plurality of slots, it can be indicated by using the following methods: information of a quantity of slots is added in the TDRA table, and UE determines the value of N based on the quantity of slots. S and L in each slot are the same.

Embodiment 2: regarding configuration or indication method of a plurality of PUSCH resources.

Method 1: A plurality of K2 may be contained in a TDRA table to clearly indicate a plurality of slots for a target PUSCH, and information of S and L in the plurality of slots is the same.

Method 2: Information of a plurality of K2, a plurality of S, and a plurality of L is contained in the TDRA table, so that the information of S and L in each slot may be different.

Figure 5:
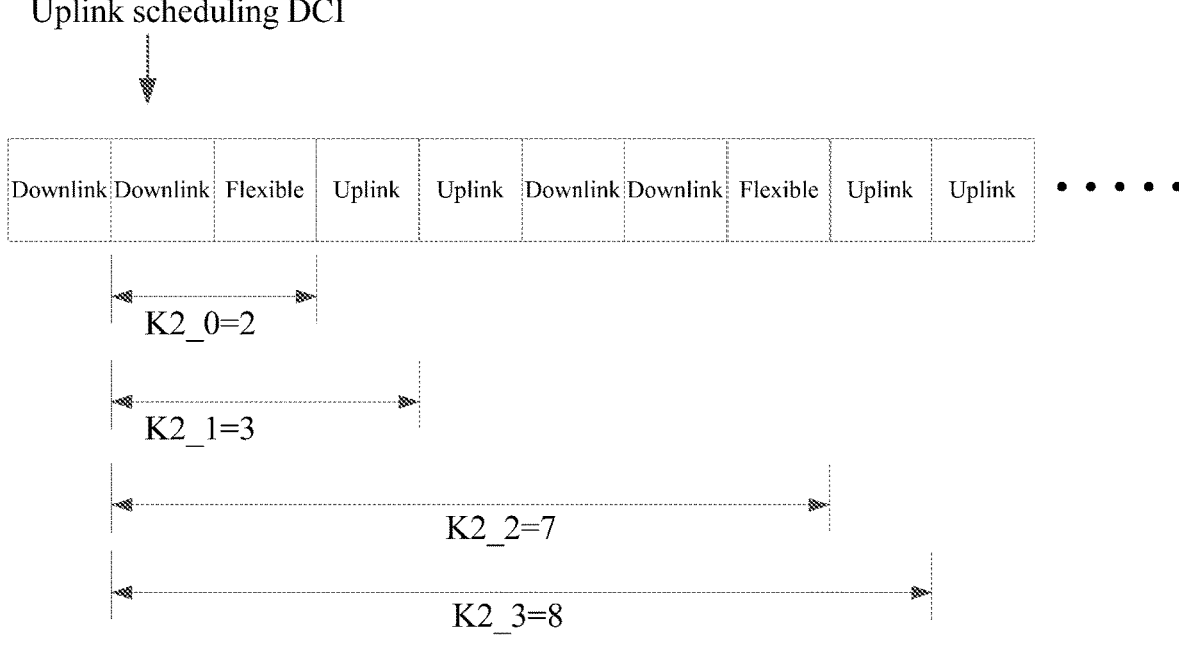
FIG. 5 is an exemplary diagram of first time offset value indication in a transmission processing method according to an embodiment of this application.

In some embodiments, as shown in FIG. 5, each K2 is used to indicate a time offset value of one slot for transmitting the target PUSCH. A plurality of slots are indicated in the foregoing method 1 and method 2, some continuous uplink symbols can be left unused, so that the terminal can perform some other uplink transmission, because the terminal may unnecessarily have a capability to perform two different type of transmission simultaneously.

Method 3: One K2 and at least one second time offset value are indicated. The second time offset value may be a time offset relative to the first transmission resource, or a time offset of a previous indication resource. In this indication method, usually, because a quantity of bits required for indication of the second time offset value is smaller than or equal to a quantity of bits required for indication of K2, a quantity of bits indicated by the DCI is further reduced.

It should be noted that the foregoing indication method can be applied to RRC signaling indication, DCI indication, and Medium Access Control Control Element (MAC-CE) indication. The indication method of the RRC signaling can be used to configure transmission of a multi-slot PUSCH of a configured grant.

A quantity of bits is indicated by a smaller DCI. Usually, a quantity of bits required for delta-K2 is smaller than or equal to a quantity of bits required for indication of K2.

Usually, currently, there is scheduling DCI that indicates and schedules repetition transmission of a PUSCH, and there is scheduling DCI that indicates transmission of a plurality of different PUSCHs. Multiple time domain resources of the transmission of the target PUSCH can be indicated by re-understanding an information field of existing DCI or by further increasing bits.

For the DCI that indicates repetition transmission of a PUSCH, if the network device configures UE with repetition transmission, and configures the UE with a multi-slot PUSCH, 1 bit can be used in the DCI to indicate which operating mode is used. If a mode of repetition transmission is indicated, the UE still performs repetition transmission of a PUSCH based on a quantity of repetition transmission in the DCI. If it is indicated that transmission is performed by using a method of a multi-slot PUSCH, information indicated by the quantity of repetition transmission is understood as a quantity of slots occupied by the multi-slot PUSCH.

If the network device does not configure repetition transmission of a PUSCH, but configures transmission of a multi-slot PUSCH, information of whether to perform repetition transmission or information of the quantity of repeat transmission in the DCI are understood as scheduling trans- mission of a multi-slot PUSCH or a quantity of resources occupied by transmission of a multi-slot PUSCH.

For the DCI that indicates scheduling of a plurality of PUSCHs, if the network device is configured with both scheduling of a plurality of PUSCHs and transmission of a multi-slot PUSCH, the DCI needs to contain 1 bit to indicate which mode to operate in. If this bit indicates using a method of transmission of a multi-slot PUSCH, indication of multiple time domain resources in the original DCI is determined as time domain resources of transmission of a multi-slot PUSCH.

If the network device does not configure scheduling of a plurality of PUSCHs, but configures transmission of a multi-slot PUSCH, a same resource allocation information field format in scheduling DCI of the plurality of PUSCHs is used. In this case, a plurality of pieces of corresponding time domain resource allocation information that indicates the plurality of PUSCHs is used to indicate multiple time domain resources of a multi-slot PUSCH.

Figure 6:
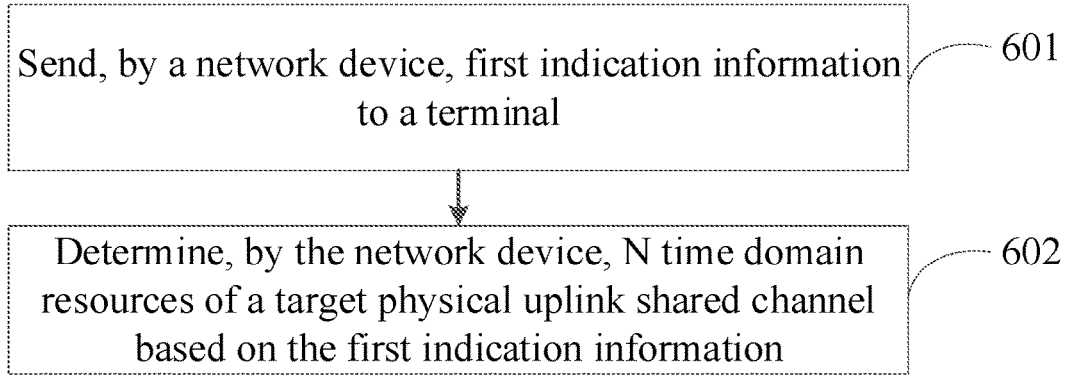
FIG. 6 is a flowchart of another transmission processing method according to an embodiment of this application.

Refer to FIG. 6. FIG. 6 is a flowchart of another transmission processing method according to an embodiment of this application. The method is performed by a network device. As shown in FIG. 6, the method includes the following steps:

Step 601: Send, by a network device, first indication information to a terminal; and Step 602: Determine, by the network device, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

In some embodiments, the N time domain resources exclude at least one of the following resources:

a downlink symbol indicated by the network device semi-statically or dynamically;

a flexible symbol indicated by the network device semi-statically or dynamically;

a time domain resource for transmitting a synchronizing signal block SSB or a channel state information-reference signal CSI-RS;

a PUSCH resource, where the network device indicates that transmission of the PUSCH resource is canceled by using a first physical downlink control channel PDCCH, and the first PDCCH is a PDCCH scrambled by a cancellation indication radio network temporary identifier CI-RNTI;

another uplink transmission resource that is used for other than the target PUSCH and that is indicated by the network device;

an invalid first time domain resource indicated by the network device; or a second time domain resource, where a number of valid symbols of the second time domain resource is smaller than a number of symbols indicated by the network device.

In some embodiments, in a case that the first indication information is used to indicate the first time domain resource of the target PUSCH, the determining, by the network device, N time domain resources of a target physical uplink shared channel PUSCH based on the first indication information includes:

determining, by the network device, N−1 time domain resources located after the first time domain resource based on a target parameter; and determining, by the network device, the N−1 time domain resources and the first time domain resource as time domain resources of the target PUSCH.

The target parameter includes at least one of the following: a frame structure, a slot structure, or a sending resource of a signal and a receiving resource of a signal.

In some embodiments, the first indication information includes a time domain resource allocation table, and the time domain resource allocation table carries an indicator of the quantity of time domain resources for transmitting the target PUSCH.

In some embodiments, in a case that the first indication information is used to indicate the N time domain resources, the first indication information includes at least one of the following:

at least one first time offset value, where each of the first time offset values corresponds to one of the time domain resources, the first time offset value is used to represent time offset of a corresponding time domain resource relative to a third time domain resource, and the third time domain resource is a time domain resource in which a receiving moment of signaling scheduling transmission of the target PUSCH is located;

at least one second time offset value, where each of the second time offset values corresponds to one of the time domain resources, the second time offset value is used to represent time offset of a corresponding time domain resource relative to a fourth time domain resource, and the fourth time domain resource is the first time domain resource of the target PUSCH or a previous time domain resource used to transmit the target PUSCH; or M groups of time domain resource information, where M is a positive integer and the time domain resource information includes a start symbol and a number of symbols.

In some embodiments, M is equal to 1 or N.

When M is equal to 1, the time domain resource information corresponding to the N time domain resources is the same; and when M is equal to N, the M groups of time domain resource information are in one-to-one correspondence to the N time domain resources.

In some embodiments, the first indication information is carried in target downlink control information DCI, and the target DCI is further used to indicate that a transmission type of a scheduled PUSCH includes any one of the following:

transmission of a single PUSCH on multiple time domain resources;

repetition transmission of a PUSCH; or transmission of a plurality of PUSCHs.

In some embodiments, when a format of the target DCI is a DCI format dedicated to scheduling the transmission of a single PUSCH on multiple time domain resources, the transmission type of the PUSCH scheduled by the target DCI is the transmission of a single PUSCH on multiple time domain resources.

In some embodiments, when the target DCI is a DCI format dedicated to scheduling the transmission of the plurality of PUSCHs, the target DCI carries second indication information, and the second indication information is used to indicate that the transmission type of the PUSCH scheduled by the target DCI is the transmission of a single PUSCH on multiple time domain resources or the transmission of the plurality of PUSCHs.

In some embodiments, the target DCI satisfies at least one of the following:

that the target DCI carries third indication information, and the third indication information indicates that the transmission type of the PUSCH scheduled by the target DCI is the transmission of a single PUSCH on multiple time domain resources; or that in a case that the network device does not configure that the terminal performs repetition transmission and configures that the terminal performs the transmission of a single PUSCH on multiple time domain resources, the target DCI is used to indicate that the transmission type of the PUSCH scheduled by the target DCI is the transmission of a single PUSCH on multiple time domain resources.

In some embodiments, a quantity of repetition transmission carried by the target DCI is used to indicate a value of N.

In some embodiments, the target DCI indicates a transmission type corresponding to the scheduled PUSCH by using a carried PDCCH, and when the PDCCH is a PDCCH scrambled by a preset RNTI, the transmission type corresponding to the PUSCH scheduled by the target DCI is the transmission of a single PUSCH on multiple time domain resources.

In some embodiments, before the network device sends first indication information to a terminal, the method further includes:

sending, by the network device, configuration information, where the configuration information is used to configure a transmission type of a PUSCH of the terminal, the transmission type includes the transmission of a single PUSCH on multiple time domain resources and the transmission of a plurality of PUSCHs, and the configuration information is radio resource control RRC semi-static configuration information or RRC static configuration information.

It should be noted that this embodiment is used as an implementation of a network device corresponding to the embodiment shown in FIG. 2. For a specific implementation of this embodiment, refer to related descriptions of the embodiment shown in FIG. 2, and a same beneficial effect can be achieved. To avoid repetition, details are not described herein again.

It should be noted that an execution subject of the transmission processing method according to an embodiment of this application may be a transmission processing apparatus, or a control module for performing the transmission processing method in the transmission processing apparatus. In the embodiments of this application, the transmission processing apparatus according to an embodiment of this application is described by using an example in which the transmission processing apparatus performs the transmission processing method.

Figure 7:
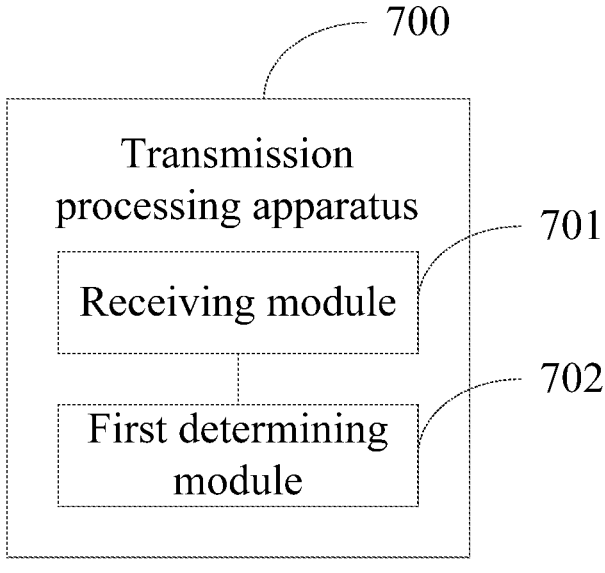
FIG. 7 is a structural diagram of a transmission processing apparatus according to an embodiment of this application.

Referring to FIG. 7, FIG. 7 is a structural diagram of a network device according to an embodiment of this application. As shown in FIG. 7, a transmission processing apparatus 700 includes:

a receiving module 701, configured to receive first indication information from a network device;

a first determining module 702, configured for determining, by the terminal, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

In some embodiments, the N time domain resources exclude at least one of the following resources:

a downlink symbol indicated by the network device semi-statically or dynamically;

a flexible symbol indicated by the network device semi-statically or dynamically;

a time domain resource for transmitting a synchronizing signal block SSB or a channel state information-reference signal CSI-RS;

a PUSCH resource, where the network device indicates that transmission of the PUSCH resource is canceled by using a first physical downlink control channel PDCCH, and the first PDCCH is a PDCCH scrambled by a cancellation indication radio network temporary identifier CI-RNTI;

another uplink transmission resource that is used for other than the target PUSCH and that is indicated by the network device;

an invalid first time domain resource indicated by the network device; or a second time domain resource, where a number of valid symbols of the second time domain resource is smaller than a number of symbols indicated by the network device.

In some embodiments, in a case that the first indication information is used to indicate the first time domain resource of the target PUSCH, the first determining module is configured for: determining, by the terminal, N–1 time domain resources located after the first time domain resource based on a target parameter; and determining, by the terminal, the N–1 time domain resources and the first time domain resource as time domain resources of the target PUSCH.

The target parameter includes at least one of the following: a frame structure, a slot structure, or a sending resource of a signal and a receiving resource of a signal.

In some embodiments, the first indication information includes a time domain resource allocation table, and the time domain resource allocation table carries an indicator of the quantity of time domain resources for transmitting the target PUSCH.

In some embodiments, in a case that the first indication information is used to indicate the N time domain resources, the first indication information includes at least one of the following:

at least one first time offset value, where each of the first time offset values corresponds to one of the time domain resources, the first time offset value is used to represent time offset of a corresponding time domain resource relative to a third time domain resource, and the third time domain resource is a time domain resource in which a receiving moment of signaling scheduling transmission of the target PUSCH is located;

at least one second time offset value, where each of the second time offset values corresponds to one of the time domain resources, the second time offset value is used to represent time offset of a corresponding time domain resource relative to a fourth time domain resource, and the fourth time domain resource is the first time domain resource of the target PUSCH or a previous time domain resource used to transmit the target PUSCH; or M groups of time domain resource information, where M is a positive integer and the time domain resource information includes a start symbol and a number of symbols.

In some embodiments, M is equal to 1 or N.

When M is equal to 1, the time domain resource information corresponding to the N time domain resources is the same; and When M is equal to N, the M groups of time domain resource information are in one-to-one correspondence to the N time domain resources.

In some embodiments, the first indication information is carried in target downlink control information DCI, and the target DCI is further used to indicate that a transmission type of a scheduled PUSCH includes any one of the following:

transmission of a single PUSCH on multiple time domain resources;

repetition transmission of a PUSCH; or transmission of a plurality of PUSCHs.

In some embodiments, the first determining module 702 is further configured for: when a format of the target DCI is a DCI format dedicated to scheduling the transmission of a single PUSCH on multiple time domain resources, determining, by the terminal, that the transmission type of the PUSCH scheduled by the target DCI is the transmission of a single PUSCH on multiple time domain resources.

In some embodiments, when the target DCI is a DCI format dedicated to scheduling the transmission of the plurality of PUSCHs, the target DCI carries second indication information, and the second indication information is used to indicate that the transmission type of the PUSCH scheduled by the target DCI is the transmission of a single PUSCH on multiple time domain resources or the transmission of the plurality of PUSCHs.

In some embodiments, the target DCI satisfies at least one of the following:

that the target DCI carries third indication information, and the third indication information indicates that the transmission type of the PUSCH scheduled by the target DCI is the transmission of a single PUSCH on multiple time domain resources; or that in a case that the network device does not configure that the terminal performs repetition transmission and configures that the terminal performs the transmission of a single PUSCH on multiple time domain resources, the target DCI is used to indicate that the transmission type of the PUSCH scheduled by the target DCI is the transmission of a single PUSCH on multiple time domain resources.

In some embodiments, a quantity of repetition transmission carried by the target DCI is used to indicate a value of N.

In some embodiments, the target DCI indicates a transmission type corresponding to the scheduled PUSCH by using a carried PDCCH, and when the PDCCH is a PDCCH scrambled by a preset RNTI, the transmission type corresponding to the PUSCH scheduled by the target DCI is the transmission of a single PUSCH on multiple time domain resources.

In some embodiments, the receiving module 701 is further configured for: receiving, by the terminal, configuration information from the network device, where the configuration information is used to configure a transmission type of a PUSCH of the terminal, the transmission type includes transmission of a single PUSCH on multiple time domain resources and transmission of a plurality of PUSCHs, and the configuration information is radio resource control RRC semi-static configuration information or RRC static configuration information.

The transmission processing apparatus provided in the embodiments of this application can implement the processes implemented in the method embodiments in FIG. 2. To avoid repetition, details are not described herein again.

Figure 8:
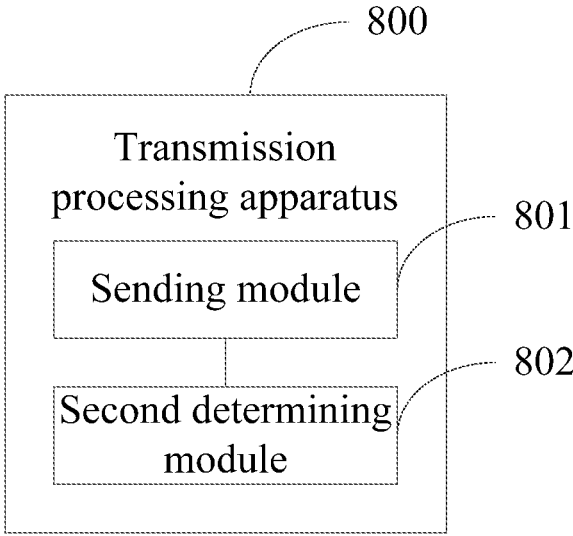
FIG. 8 is a structural diagram of a transmission processing apparatus according to an embodiment of this application.

Refer to FIG. 8. FIG. 8 is a structural diagram of a network device according to an embodiment of this application. As shown in FIG. 8, the transmission processing apparatus 800 includes:

a sending module 801, configured for sending, by a network device, first indication information to a terminal; and a second determining module 802, configured for determining, by the network device, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

In some embodiments, the N time domain resources exclude at least one of the following resources:

a downlink symbol indicated by the network device semi-statically or dynamically;

a flexible symbol indicated by the network device semi-statically or dynamically;

a time domain resource for transmitting a synchronizing signal block SSB or a channel state information-reference signal CSI-RS;

a PUSCH resource, where the network device indicates that transmission of the PUSCH resource is canceled by using a first physical downlink control channel PDCCH, and the first PDCCH is a PDCCH scrambled by a cancellation indication radio network temporary identifier CI-RNTI;

another uplink transmission resource that is used for other than the target PUSCH and that is indicated by the network device;

an invalid first time domain resource indicated by the network device; or a second time domain resource, where a number of valid symbols of the second time domain resource is smaller than a number of symbols indicated by the network device.

In some embodiments, in a case that the first indication information is used to indicate the first time domain resource of the target PUSCH, the second determining module 802 is configured for: determining, by the terminal, N−1 time domain resources located after the first time domain resource based on a target parameter; and determining, by the terminal, the N−1 time domain resources and the first time domain resource as time domain resources of the target PUSCH.

The target parameter includes at least one of the following: a frame structure, a slot structure, or a sending resource of a signal and a receiving resource of a signal.

In some embodiments, the first indication information includes a time domain resource allocation table, and the time domain resource allocation table carries an indicator of the quantity of time domain resources for transmitting the target PUSCH.

In some embodiments, in a case that the first indication information is used to indicate the N time domain resources, the first indication information includes at least one of the following:

at least one first time offset value, where each of the first time offset values corresponds to one of the time domain resources, the first time offset value is used to represent time offset of a corresponding time domain resource relative to a third time domain resource, and the third time domain resource is a time domain resource in which a receiving moment of signaling scheduling transmission of the target PUSCH is located;

at least one second time offset value, where each of the second time offset values corresponds to one of the time domain resources, the second time offset value is used to represent time offset of a corresponding time domain resource relative to a fourth time domain resource, and the fourth time domain resource is the first time domain resource of the target PUSCH or a previous time domain resource used to transmit the target PUSCH; or M groups of time domain resource information, where M is a positive integer and the time domain resource information includes a start symbol and a number of symbols.

In some embodiments, M is equal to 1 or N.

When M is equal to 1, the time domain resource information corresponding to the N time domain resources is the same; and When M is equal to N, the M groups of time domain resource information are in one-to-one correspondence to the N time domain resources.

In some embodiments, the first indication information is carried in target downlink control information DCI, and the target DCI is further used to indicate that a transmission type of a scheduled PUSCH includes any one of the following:

transmission of a single PUSCH on multiple time domain resources;

repetition transmission of a PUSCH; or transmission of a plurality of PUSCHs.

In some embodiments, when a format of the target DCI is a DCI format dedicated to scheduling the transmission of a single PUSCH on multiple time domain resources, the transmission type of the PUSCH scheduled by the target DCI is the transmission of a single PUSCH on multiple time domain resources.

In some embodiments, when the target DCI is a DCI format dedicated to scheduling the transmission of the plurality of PUSCHs, the target DCI carries second indication information, and the second indication information is used to indicate that the transmission type of the PUSCH scheduled by the target DCI is the transmission of a single PUSCH on multiple time domain resources or the transmission of the plurality of PUSCHs.

In some embodiments, the target DCI satisfies at least one of the following:

that the target DCI carries third indication information, and the third indication information indicates that the transmission type of the PUSCH scheduled by the target DCI is the transmission of a single PUSCH on multiple time domain resources; or that in a case that the network device does not configure that the terminal performs repetition transmission and configures that the terminal performs the transmission of a single PUSCH on multiple time domain resources, the target DCI is used to indicate that the transmission type of the PUSCH scheduled by the target DCI is the transmission of a single PUSCH on multiple time domain resources.

In some embodiments, a quantity of repetition transmission carried by the target DCI is used to indicate a value of N.

In some embodiments, the target DCI indicates a transmission type corresponding to the scheduled PUSCH by using a carried PDCCH, and when the PDCCH is a PDCCH scrambled by a preset RNTI, the transmission type corresponding to the PUSCH scheduled by the target DCI is the transmission of a single PUSCH on multiple time domain resources.

In some embodiments, the sending module 801 is further configured for sending, by the network device, configuration information, where the configuration information is used to configure a transmission type of a PUSCH of the terminal, the transmission type includes the transmission of a single PUSCH on multiple time domain resources and the transmission of a plurality of PUSCHs, and the configuration information is radio resource control RRC semi-static configuration information or RRC static configuration information.

The transmission processing apparatus provided in the embodiments of this application can implement the processes implemented by the transmission processing apparatus in the method embodiments in FIG. 6. To avoid repetition, details are not described herein again.

The transmission processing apparatus in the embodiments of this application may be an apparatus, or a component, an integrated circuit, or a chip in a terminal. The apparatus may be a mobile terminal, or a non-mobile terminal. For example, the mobile terminal may include but is not limited to the types of the terminal 11 listed above, and the non-mobile terminal may be a server, a Network Attached Storage (NAS), a personal computer (PC), a television (TV), an automated teller machine, or a self-service machine. This is not specifically limited in the embodiments of this application.

The transmission processing apparatus in the embodiments of this application may be an apparatus with an operating system. The operating system may be an Android operating system, may be an iOS operating system, or may be another possible operating system. This is not specifically limited in the embodiments of this application.

The transmission processing apparatus provided in the embodiments of this application can implement the processes implemented in the method embodiments in FIG. 2 to FIG. 6, with the same technical effect achieved. To avoid repetition, details are not described herein again.

Figure 9:
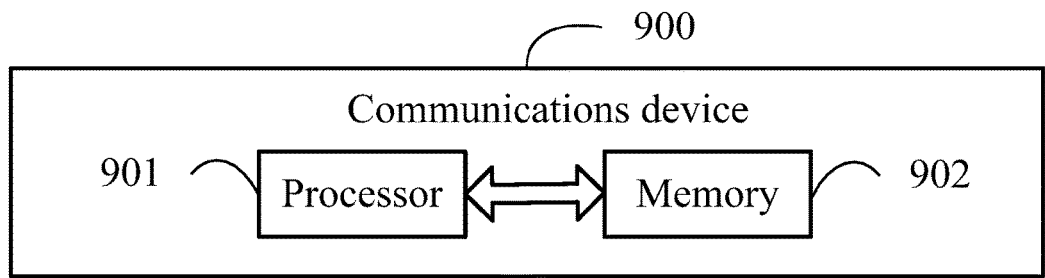
FIG. 9 is a structural diagram of a communications device according to an embodiment of this application.

As shown in FIG. 9, an embodiment of this application further provides a communications device 900, including a processor 901, a memory 902, and a program or instruction stored in the memory 902 and capable of running on the processor 901. For example, when the communications device 900 is a terminal and the program or the instruction is executed by the processor 901, the processes of the foregoing transmission processing method embodiments are implemented, with the same technical effects achieved. When the communications device 900 is a network device and the program or the instruction is executed by a processor 901, the processes in the foregoing transmission processing method embodiments are implemented, with the same technical effect achieved. To avoid repetition, details are not described herein again.

Figure 10:
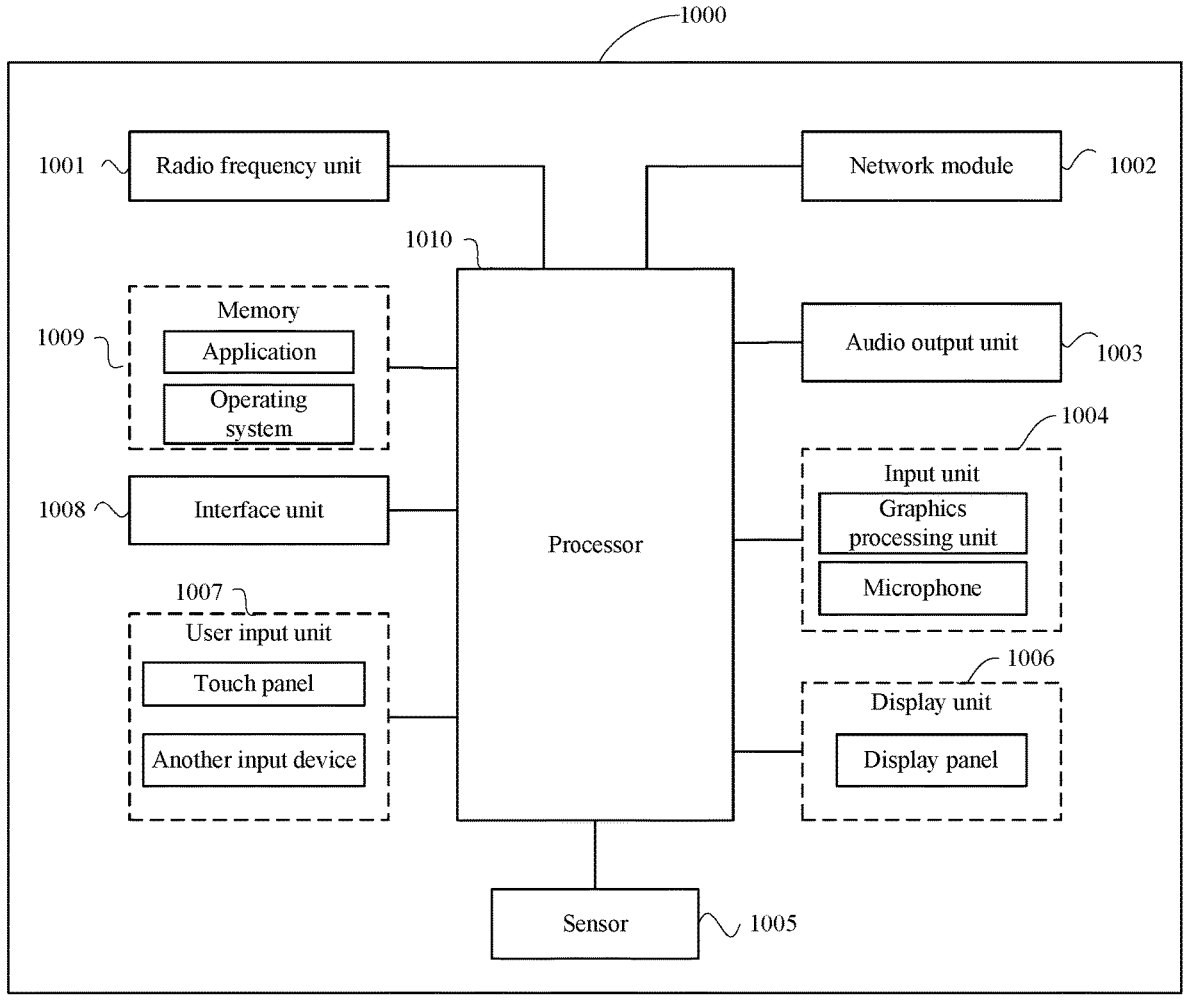
FIG. 10 is a structural diagram of a terminal according to an embodiment of this application.

FIG. 10 is a schematic diagram of a hardware structure of a terminal according to each embodiment of this application.

A terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (such as a battery) that supplies power to each component. The power supply may be logically connected to the processor 1010 by using a power supply management system, to implement functions such as charging and discharging management, and power consumption management by using the power supply management system. The terminal structure shown in FIG. 10 constitutes no limitation on the terminal, and the terminal may include more or fewer components than those shown in the figure, or combine some components, or have different component arrangements. Details are not described herein.

It should be understood that, in this embodiment of this application, the input unit 1004 may include a Graphics Processing Unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, or the like. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In the embodiments of this application, after receiving downlink data from a network device, the radio frequency unit 1001 sends the downlink data to the processor 1010 for processing, and sends uplink data to the network device. Generally, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, and an application program or an instruction required by at least one function (for example, a sound playing function or an image playing function). In addition, the memory 1009 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one disk storage device, a flash memory device, or another non-volatile solid-state storage device.

The processor 1010 may include one or more processing units. In some embodiments, an application processor and a modem processor may be integrated into the processor 1010. The application processor mainly processes an operating system, a user interface, an application, an instruction, or the like. The modem processor mainly processes wireless communications, for example, a baseband processor. It can be understood that, alternatively, the modem processor may not be integrated into the processor 1010.

The radio frequency unit 1001 is configured for receiving, by a terminal, first indication information from a network device.

The processor 1010 is configured for determining, by the terminal, N time domain resources of a target physical uplink shared channel PUSCH based on the first indication information, where N is an integer greater than 1.

The first indication information is used to indicate at least one of the following:

the first time domain resource of the target PUSCH;

a quantity of time domain resources for transmitting the target PUSCH, and a start symbol occupied in one time domain resource and a symbol length; or the N time domain resources.

It should be understood that, in this embodiment, the processor 1010 and the radio frequency unit 1001 can implement the processes implemented by the terminal in the method embodiment in FIG. 2. To avoid repetition, details are not described herein again.

Figure 11:
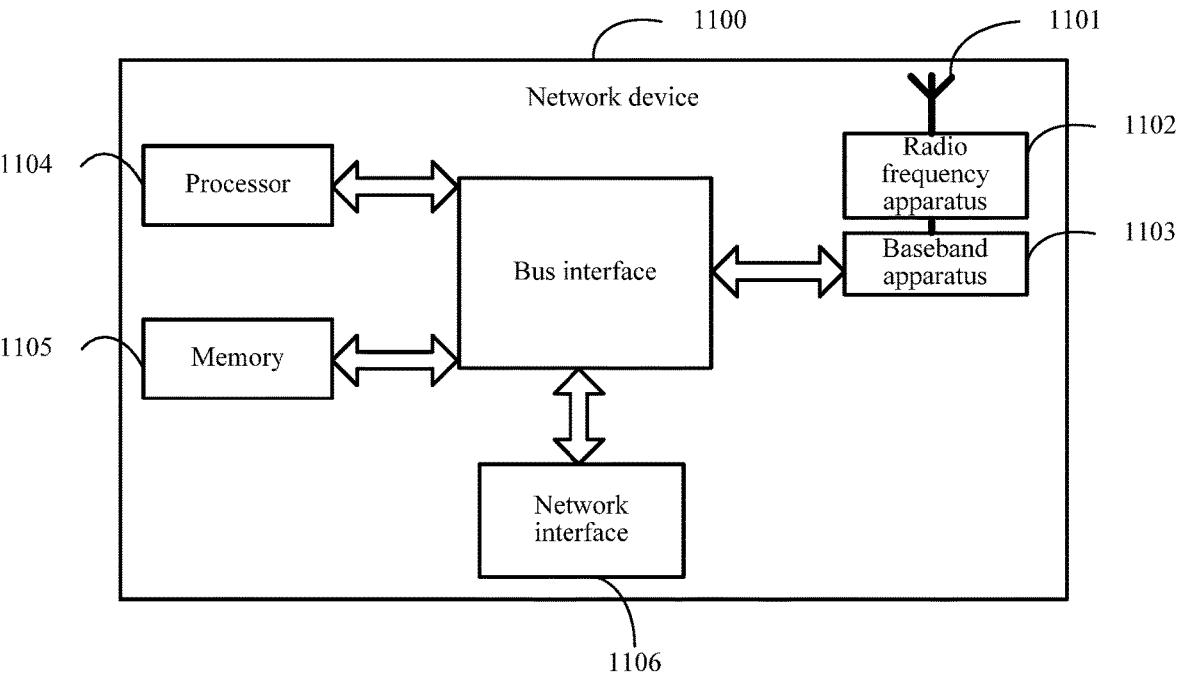
FIG. 11 is a structural diagram of a network device according to an embodiment of this application.

An embodiment of this application further provides a network device. As shown in FIG. 11, the network device 1100 includes an antenna 1101, a radio frequency apparatus 1102, and a baseband apparatus 1103. The antenna 1101 is connected to the radio frequency apparatus 1102. In an uplink direction, the radio frequency apparatus 1102 receives information through the antenna 1101, and sends the received information to the baseband apparatus 1103 for processing. In a downlink direction, the baseband apparatus 1103 processes to-be-sent information, and sends the to-be-sent information to the radio frequency apparatus 1102. After processing the received information, the radio frequency apparatus 1102 sends the information by using the antenna 1101.

The foregoing band processing apparatus may be located in the baseband apparatus 1103. In the foregoing embodiment, a method performed by the network device may be implemented in the baseband apparatus 1103. The baseband apparatus 1103 includes a processor 1104 and a memory 1105.

The baseband apparatus 1103 may include, for example, at least one baseband board, where a plurality of chips are disposed on the baseband board. As shown in FIG. 11, one chip is, for example, the processor 1104, which is connected to the memory 1105, so as to invoke a program in the memory 1105 to perform operations of the network device shown in the foregoing method embodiment.

The baseband apparatus 1103 may further include a network interface 1106, configured to exchange information with the radio frequency apparatus 1102, where the interface is, for example, a common public radio interface (CPRI).

The network device in the embodiments of this application further includes an instruction or a program that is stored in the memory 1105 and capable of running on the processor 1104. The processor 1104 invokes the instruction or the program in the memory 1105 to perform the method performed by the modules shown in FIG. 8, with the same technical effects achieved. To avoid repetition, details are not described herein.

An embodiment of this application further provides a readable storage medium. The readable storage medium stores a program or an instruction. When the program or the instruction is executed by a processor, the processes in the foregoing transmission processing method embodiments are implemented, with the same technical effects achieved. To avoid repetition, details are not described herein again.

The processor is a processor in the electronic device in the foregoing embodiment. The readable storage medium includes a computer-readable storage medium, such as a computer Read-only Memory (ROM), a Random Access Memory (RAM), a magnetic disk, or an optical disc.

An embodiment of this application further provides a chip. The chip includes a processor and a communications interface, and the communications interface is coupled to the processor. The processor is configured to run a program or an instruction of a network device, to implement various processes of the foregoing transmission processing method embodiments, with the same technical effects achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a program product. The program product is stored in a non-volatile storage medium. The program product is executed by at least one processor to implement various processes of the foregoing transmission processing method embodiments, with the same technical effects achieved. To avoid repetition, details are not described herein again.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a base station, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A transmission processing method, comprising:

receiving, by a terminal, first indication information from a network device; and determining, by the terminal, N slots of a target physical uplink shared channel (PUSCH) based on the first indication information, wherein N is an integer greater than 1, and the first indication information is used to indicate at least one of the following:

the first slot of the target PUSCH;

a quantity of slots for transmitting the target PUSCH, and a start symbol occupied in one slot and a symbol length; or the N slots, wherein the first indication information is carried in target downlink control information (DCI), and the target DCI is used to indicate that a transmission type of a scheduled PUSCH comprises transmission of a single PUSCH on multiple slots.

2. The transmission processing method according to claim 1, wherein determining the N slots of the target PUSCH based on the first indication information comprises:

determining, by the terminal, at least one of the following is not a valid resource of the target PUSCH:

a downlink symbol indicated by the network device semi-statically or dynamically;

a flexible symbol indicated by the network device semi-statically or dynamically;

a time domain resource for transmitting a synchronizing signal block (SSB) or a channel state information-reference signal (CSI-RS);

a PUSCH resource, wherein the network device indicates that transmission of the PUSCH resource is canceled by using a first physical downlink control channel (PDCCH), and the first PDCCH is a PDCCH scrambled by a cancellation indication radio network temporary identifier (CI-RNTI);

another uplink transmission resource that is used for other than the target PUSCH and that is indicated by the network device;

an invalid first time domain resource indicated by the network device; or a second time domain resource, wherein a number of valid symbols of the second time domain resource is smaller than a number of symbols indicated by the network device.

3. The transmission processing method according to claim 1, wherein when the first indication information is used to indicate the first slot of the target PUSCH, determining, by the terminal, the N slots of the target physical uplink shared channel (PUSCH) based on the first indication information comprises:

determining, by the terminal, N−1 slots located after the slot based on a target parameter; and determining, by the terminal, the N−1 slots and the first slot as slots of the target PUSCH, wherein the target parameter comprises at least one of the following: a frame structure, a slot structure, or a sending resource of a signal and a receiving resource of a signal.

4. The transmission processing method according to claim 1, wherein when the first indication information is used to indicate the N slots, the first indication information comprises at least one of the following:

at least one first time offset value, wherein each of the first time offset values corresponds to one of the slots, the first time offset value is used to represent time offset of a corresponding slot relative to a third slot, and the third slot is a slot in which a receiving moment of signaling scheduling transmission of the target PUSCH is located;

at least one second time offset value, wherein each of the second time offset values corresponds to one of the slots, the second time offset value is used to represent time offset of a corresponding slot relative to a fourth slot, and the fourth slot is the first slot of the target PUSCH or a previous slot used to transmit the target PUSCH; or M groups of slot information, wherein M is a positive integer, the slot information comprises a start symbol and a number of symbols, wherein M is equal to 1 or N, wherein:

when M is equal to 1, the slot information corresponding to the N slots is the same; and when M is equal to N, the M groups of slot information are in one-to-one correspondence to the N slots.

5. The transmission processing method according to claim 1, wherein before the receiving, by a terminal, first indication information from a network device, the method further comprises:

receiving, by the terminal, configuration information from the network device, wherein the configuration information is used to configure a transmission type of a PUSCH of the terminal, the transmission type comprises the transmission of a single PUSCH on multiple slots and the transmission of a plurality of PUSCHs, and the configuration information is radio resource control RRC semi-static configuration information or RRC static configuration information.

6. A transmission processing method, comprising:

sending, by a network device, first indication information to a terminal; and determining, by the network device, N slots of a target physical uplink shared channel (PUSCH) based on the first indication information, wherein N is an integer greater than 1, and the first indication information is used to indicate at least one of the following:

the first slot of the target PUSCH;

a quantity of slots for transmitting the target PUSCH, and a start symbol occupied in one slot and a symbol length; or the N slots, wherein the first indication information is carried in target downlink control information (DCI), and the target DCI is used to indicate that a transmission type of a scheduled PUSCH comprises transmission of a single PUSCH on multiple slots.

7. The transmission processing method according to claim 6, wherein determining, by the network device, the N slots of the target PUSCH based on the first indication information comprises:

determining at least one of the following is not a valid resource of the target PUSCH:

a downlink symbol indicated by the network device semi-statically or dynamically;

a flexible symbol indicated by the network device semi-statically or dynamically;

a time domain resource for transmitting a synchronizing signal block (SSB) or a channel state information-reference signal (CSI-RS);

a PUSCH resource, wherein the network device indicates that transmission of the PUSCH resource is canceled by using a first physical downlink control channel PDCCH, and the first PDCCH is a PDCCH scrambled by a cancellation indication radio network temporary identifier (CI-RNTI);

another uplink transmission resource that is used for other than the target PUSCH and that is indicated by the network device;

an invalid first time domain resource indicated by the network device; or a second time domain resource, wherein a number of valid symbols of the second time domain resource is smaller than a number of symbols indicated by the network device.

8. The transmission processing method according to claim 6, wherein when the first indication information is used to indicate the first slot of the target PUSCH, determining, by the network device, the N slots of the target physical uplink shared channel (PUSCH) based on the first indication information comprises:

determining, by the network device, N−1 slots located after the first slot based on a target parameter; and determining, by the network device, the N−1 slots and the first slot as slots of the target PUSCH, wherein the target parameter comprises at least one of the following: a frame structure, a slot structure, or a sending resource of a signal and a receiving resource of a signal.

9. The transmission processing method according to claim 6, wherein when the first indication information is used to indicate the N slots, the first indication information comprises at least one of the following:

at least one first time offset value, wherein each of the first time offset values corresponds to one of the slots, the first time offset value is used to represent time offset of a corresponding slot relative to a third slot, and the third slot is a slot in which a receiving moment of signaling scheduling transmission of the target PUSCH is located;

at least one second time offset value, wherein each of the second time offset values corresponds to one of the slots, the second time offset value is used to represent time offset of a corresponding slot relative to a fourth slot, and the fourth slot is the first slot of the target PUSCH or a previous slot used to transmit the target PUSCH; or M groups of slot information, wherein M is a positive integer, the slot information comprises a start symbol and a number of symbols, wherein M is equal to 1 or N, wherein:

when M is equal to 1, the slot information corresponding to the N slots is the same; and when M is equal to N, the M groups of slot information are in one-to-one correspondence to the N slots.

10. The transmission processing method according to claim 6, wherein before sending, by the network device, the first indication information to the terminal, the method further comprises:

sending, by the network device, configuration information, wherein the configuration information is used to configure a transmission type of a PUSCH of the terminal, the transmission type comprises the transmission of a single PUSCH on multiple slots and the transmission of a plurality of PUSCHs, and the configuration information is radio resource control (RRC) semi-static configuration information or RRC static configuration information.

11. A terminal, comprising:

a memory storing a computer program; and a processor coupled to the memory and configured to execute the computer program to perform operations comprising:

receiving, by the terminal, first indication information from a network device; and determining, by the terminal, N slots of a target physical uplink shared channel (PUSCH) based on the first indication information, wherein N is an integer greater than 1, and the first indication information is used to indicate at least one of the following:

the first slot of the target PUSCH;

a quantity of slots for transmitting the target PUSCH, and a start symbol occupied in one slot and a symbol length; or the N slots, wherein the first indication information is carried in target downlink control information (DCI), and the target DCI is used to indicate that a transmission type of a scheduled PUSCH comprises transmission of a single PUSCH on multiple slots.

12. The terminal according to claim 11, wherein determining the N slots of the target PUSCH based on the first indication information comprises:

determining, by the terminal, at least one of the following is not a valid resource of the target PUSCH:

a downlink symbol indicated by the network device semi-statically or dynamically;

a flexible symbol indicated by the network device semi-statically or dynamically;

a time domain resource for transmitting a synchronizing signal block (SSB) or a channel state information-reference signal (CSI-RS);

a PUSCH resource, wherein the network device indicates that transmission of the PUSCH resource is canceled by using a first physical downlink control channel (PDCCH), and the first PDCCH is a PDCCH scrambled by a cancellation indication radio network temporary identifier (CI-RNTI);

another uplink transmission resource that is used for other than the target PUSCH and that is indicated by the network device;

an invalid first time domain resource indicated by the network device; or a second time domain resource, wherein a number of valid symbols of the second time domain resource is smaller than a number of symbols indicated by the network device.

13. The terminal according to claim 11, wherein when the first indication information is used to indicate the first slot of the target PUSCH, determining, by the terminal, the N slots of the target physical uplink shared channel (PUSCH) based on the first indication information comprises:

determining, by the terminal, N−1 slots located after the slot based on a target parameter; and determining, by the terminal, the N−1 slots and the first slot as slots of the target PUSCH, wherein the target parameter comprises at least one of the following: a frame structure, a slot structure, or a sending resource of a signal and a receiving resource of a signal.

14. The terminal according to claim 11, wherein when the first indication information is used to indicate the N slots, the first indication information comprises at least one of the following:

at least one first time offset value, wherein each of the first time offset values corresponds to one of the slots, the first time offset value is used to represent time offset of a corresponding slot relative to a third slot, and the third slot is a slot in which a receiving moment of signaling scheduling transmission of the target PUSCH is located;

at least one second time offset value, wherein each of the second time offset values corresponds to one of the slots, the second time offset value is used to represent time offset of a corresponding slot relative to a fourth slot, and the fourth slot is the first slot of the target PUSCH or a previous slot used to transmit the target PUSCH; or M groups of slot information, wherein M is a positive integer, the slot information comprises a start symbol and a number of symbols, wherein M is equal to 1 or N, wherein:

when M is equal to 1, the slot information corresponding to the N slots is the same; and when M is equal to N, the M groups of slot information are in one-to-one correspondence to the N slots.

15. A network device, comprising: a memory, a processor, and a program or an instruction stored in the memory and capable of running on the processor, wherein when the program or the instruction is executed by the processor, the steps of the transmission processing method according to claim 6 is implemented.

\* \* \* \* \*